United States Patent [19]

Keck et al.

[11] Patent Number: 5,054,195
[45] Date of Patent: Oct. 8, 1991

[54] PROCESS FOR THE PRODUCTION OF A VALVE

[75] Inventors: Volker Keck, Stuttgart; Pavel Hora, Kornwestheim; Walter Conradt, Gaildorf, all of Fed. Rep. of Germany

[73] Assignee: Mercedes-Benz AG, Fed. Rep. of Germany

[21] Appl. No.: 578,288

[22] Filed: Sep. 6, 1990

[30] Foreign Application Priority Data

Sep. 6, 1989 [DE] Fed. Rep. of Germany ....... 3929534

[51] Int. Cl.$^5$ .............................................. B21D 53/00
[52] U.S. Cl. ........................... 29/888.453; 29/888.451; 29/888.452; 29/888.46
[58] Field of Search ............. 29/888.4, 888.43, 888.44, 29/888.45, 888.451, 888.452, 888.453, 888.46, 428, 557, 527.1; 123/188 A, 188 AA

[56] References Cited

U.S. PATENT DOCUMENTS

| | | |
|---|---|---|
| 1,948,793 | 2/1934 | Lewis, Jr. .................... 29/888.45 |
| 2,354,947 | 8/1944 | Colwell ..................... 29/888.45 X |
| 2,407,561 | 9/1946 | Lincoln ..................... 29/888.45 X |
| 2,410,190 | 10/1946 | Townhill ..................... 29/888.45 |
| 2,432,761 | 12/1947 | Hoern ....................... 29/888.45 X |
| 2,455,299 | 11/1948 | Cooley ...................... 29/888.452 |
| 3,319,321 | 5/1967 | Davis ........................ 29/888.4 X |
| 3,378,904 | 4/1968 | Prasse et al. ................ 29/888.45 |
| 3,710,773 | 1/1973 | Piech et al. ................. 29/888.44 |
| 4,263,799 | 4/1981 | Motizuki .................... 29/888.45 |
| 4,741,080 | 5/1988 | Larson et al. ............... 29/888.44 X |

*Primary Examiner*—Irene Cuda
*Attorney, Agent, or Firm*—Evenson, Wands, Edwards, Lenahan & McKeown

[57] ABSTRACT

A process for the production of a valve, in particular a charge cycle valve of an internal-combustion engine, having a separately produced hollow valve shank with a widening shank section arranged at the valve-side end, which is connected to a valve disk of highly heat resistant material. The valve shank is produced from a tubular starting material by cold forming to the shank diameter, and subsequently a transitional region lying between reduced valve shank and starting material is shaped as a shank section widening in the form of an arc. The valve shank is severed at the widening shank section at a point corresponding to the diameter of the point of connection between valve disk and valve shank.

11 Claims, 3 Drawing Sheets

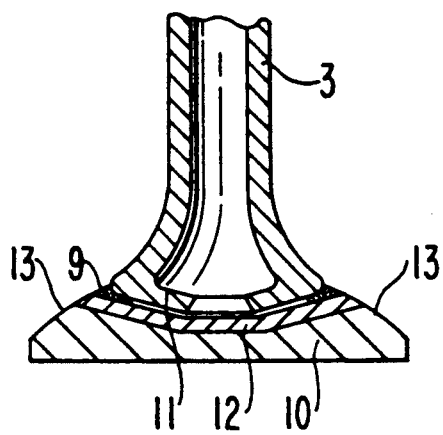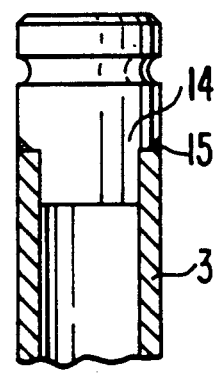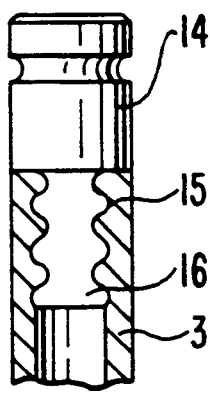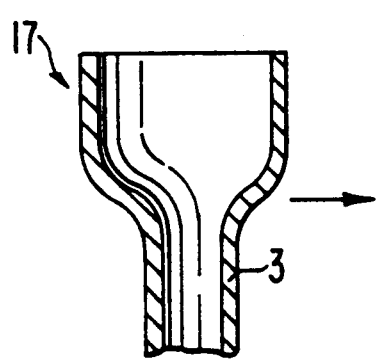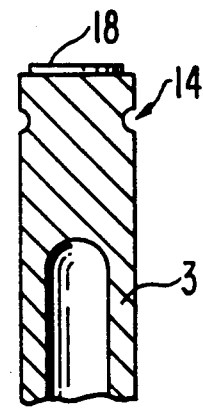

PROCESS FOR THE PRODUCTION OF A VALVE

BACKGROUND AND SUMMARY OF INVENTION

The invention relates to a process for the production of a valve, in particular a charge cycle valve of an internal-combustion engine.

U.S. Pat. No. 2,316,488 discloses a valve composed of two separately produced parts of different material for an internal-combustion engine. The valve has a cast hollow shank of high tensile strength, filled with coolant, as well as a highly heat resistant valve disk, which forms the valve base and valve back extending beyond the valve seat and reaching as far as the point of connection of the valve disk with the widening valve shank. The valve shank and valve disk are welded to each other at this point of connection. The purpose of this two-part construction of the valve with a cast valve shank is to save on highly heat resistant material, which is also difficult to work, by using it only for the highly stressed valve disk itself. In the case of such a valve, although the valve shank can be cast in a simple way, it is necessary subsequently to further machine the valve shank to improve the surface quality. In this machine operation, material is removed from the shank surface, which requires that the wall of the shank be of a certain sufficient thickness. By prescribing this minimum wall thickness, the interior space which can be filled with coolant is inevitably smaller and the weight of the valve shank increases.

The object of the present invention is therefore to produce a valve of the generic type in such a way that a solid and yet lightweight valve which is provided with a large interior volume can be made in a simple production operation.

This object is achieved according to the invention by cold forming of a tubular starting material. That is, the tubular starting material is reduced at a temperature which lies below the recrystallization temperature of the material, at its one end from its original diameter to the desired valve shank diameter, for example by round kneading with an inserted mandrel corresponding to the desired internal cross-section of the valve shank. In the same operation, the transitional region between unworked, tubular starting material and reduced valve shank is shaped by means of the kneading operation with suitable tools as a shank section widening in the form of an arc. This finally formed valve shank is subsequently severed from the tubular starting material at a point corresponding to the diameter of the connection between the valve disk and valve shank. Thereafter, the valve shank is welded to the valve disk, produced from a highly heat resistant material in its own working operation, and, after any appropriate filling of the valve with a coolant, is closed at the top shank end, which was previously open. The expensive, highly heat resistant material which is difficult to work is used only for the production of the highly stressed valve disk, whereas a cheaper starting material which is easier to work may be employed for producing the less stressed valve shank. Within the scope of the invention, the internal cross-section can be maintained exactly by means of an inserted mandrel. In addition, a shank surface of high quality with low peak-to-valley height is formed, which simplifies the subsequent finishing of the valve shank.

Other objects, advantages and novel features of the present invention will become apparent from the following detailed description of the invention when considered in conjunction with the accompanying drawings.

BRIEF DESCRIPTION OF THE DRAWINGS

FIGS. 6 and 7 show two different embodiments for the termination of the top shank end, and FIGS. 8 and 9 show a differently formed shank end and the termination of the valve shank which can be produced thereby.

DETAILED DESCRIPTION OF THE DRAWINGS

Figure 1:
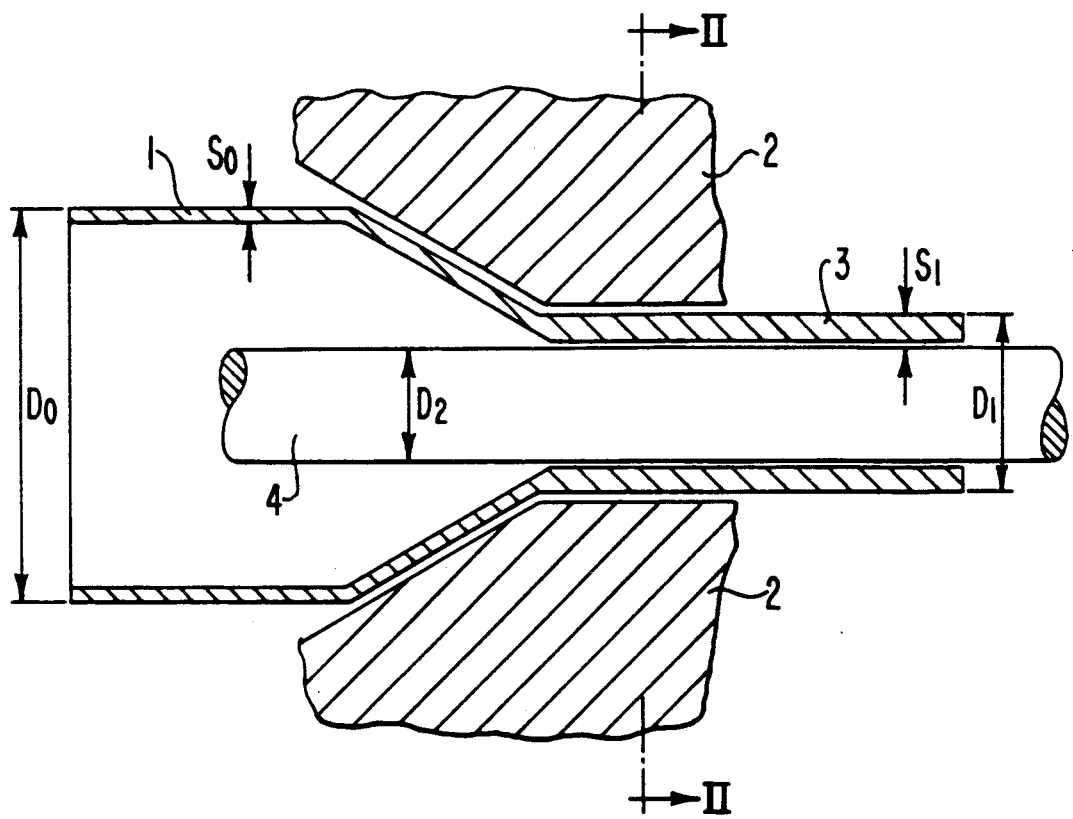
FIG. 1 shows the first step of the process according to the invention, in which the tubular starting material is reduced to the shank diameter.
Figure 2:
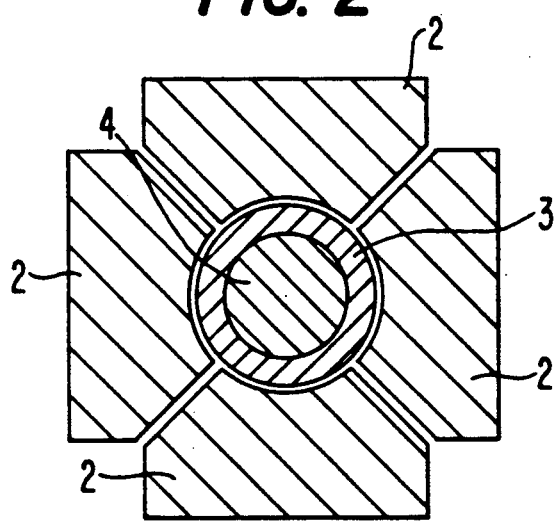
FIG. 2 shows the same working step in cross-section according to the line of intersection II—II in FIG. 1.

FIG. 1 depicts the reduction of the tubular starting material 1 of external diameter $D_0$ by means of suitable tools 2, to the desired external diameter $D_1$ of the valve shank 3. This takes place by means of a known cold forming process, for example as represented here by round kneading. FIG. 2 shows this step in cross-section according to line of intersection II—II in FIG. 1, in which 2 again denotes the tools—in this case four hammers of a round-kneading machine that is known per se. Due to the fixed material volume, during round kneading the wall thickness $S_0$ of the tubular starting material 1 must thicken to the wall thickness $S_1$ of the valve shank 3. The desired internal diameter $D_2$ of the valve shank 3 is achieved by inserting a mandrel 4 into the starting material 1. The advantages of round kneading are that a cheap and lightweight material—virtually every metallic material of sufficient expansion ($>$ about 6%) is suitable for this—can be worked in a short working time with high strength accompanied by a favorable fibre flow and with good tolerance values. In spite of high strength, the wall thickness of the valve shank 3 can be kept small, and consequently a large internal volume can be formed, for example for receiving a cooling medium. In addition, the weight of the valve shank 3 is kept small, resulting in a positive influence on the entire valve operating mechanism. The achievable tolerances in production of the valve shank 3 are up to ±0.02 mm with a typical roughness of 2-3 $\mu$m. Such surfaces are less rough in their microstructure compared with surfaces produced in a machining process and the risk of wear during friction is less. Instead of round kneading, it is also conceivable that the valve shank can be produced by the process in its basic form by cold rolling. The choice of process depends among other things on the geometrical conditions.

Figure 3:
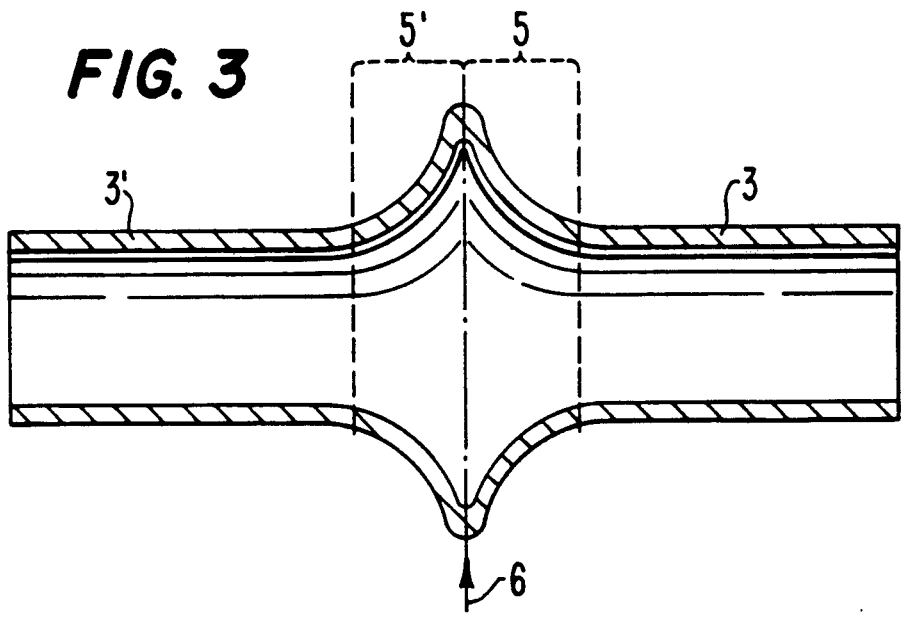
FIG. 3 shows the second and third steps of the process according to the invention.

FIG. 3 depicts the next working step, in which the previously formed valve shank 3 receives at its transitional region 5 the arc shape, i.e. the so called compound curve, desired for the transition between valve shank 3 and later-fitted valve disk, by means of suitable hammering tools (not shown) of the round-kneading machine. It can also be seen in this figure that two valve shanks 3, 3' can be produced from the one tubular piece of the starting material by clamping the valve shank 3, already formed in a preceding working operation, into the tool by its already worked part and forming the as yet unworked end of the tubular starting material in the manner described above into a second valve shank 3' having a second transitional region 5'. Thereafter, the two valve shanks 3 and 3', or the valve shank 3 and the tubular starting material, are separated from each other—as indicated by the arrow 6, for example by cutting off. In this way, two valve shanks 3 and 3' can be produced simply and quickly from one piece of the starting material.

Figure 4:
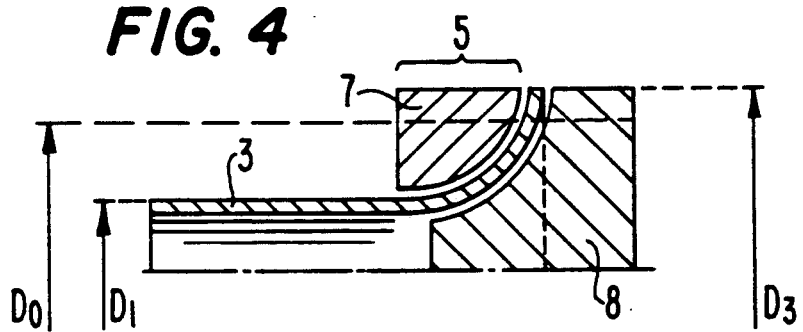
FIG. 4 shows an optional further process step.

If the specific geometrical design of the valve shank 3 with its transitional region 5 requires that the final diameter $D_3$ of the transitional region 5 must be greater than the diameter $D_0$ of the untreated tubular starting material, the valve shank 3 can—as shown in FIG. 4—be further shaped correspondingly by means of further tools, for example male dies 7 and 8.

The surface of such a valve is usually hard chromium-plated. Due to the high surface quality achieved in the round-kneading employed according to the invention, the valve may be finished simply by grinding this chromium surface, without machining the actual valve material.

Figure 5A:
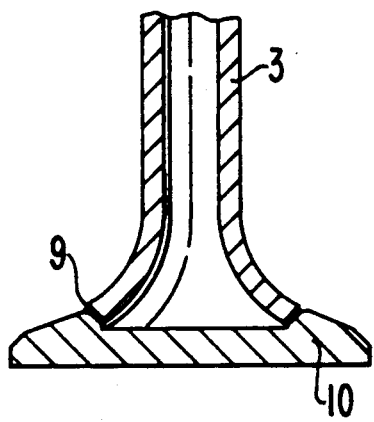
FIGS. 5 a, b, c show different embodiments of the connection between valve shank and valve disk.
Figure 5B:
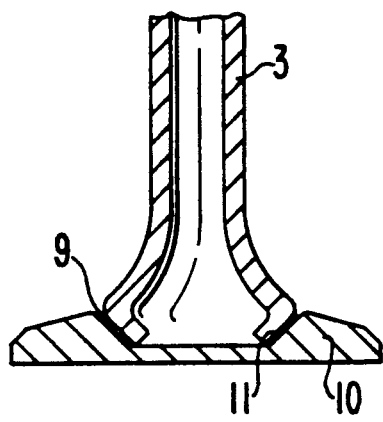

FIGS. 5a to 5c in each case show the bottom end of the valve shank 3, which is connected, for example by laser welding, to the valve disk 10 at a point of connection 9 of the valve back. As the representative embodiments a to c show, because of different cooling requirements among other things, the valve disk 10, which is produced from a highly heat resistant material, for example a cobalt-based alloy, may have a different shape, and valve shank 3 must be designed at the point of connection 9 according to the shape of the valve disk 10. For instance, the shape of the valve disk 10 according to FIG. 5a allows the simple acceptance if the valve shank 3 produced by means of the process described above. For the exemplary embodiments according to FIGS. 5b and 5c, the valve shank 3 also has to be additionally provided with an inwardly beaded border 11. In FIG. 5c, a connecting layer 12, introduced between valve shank 3 and valve disk 10, is provided for example for better connection of the two said components in a soldering operation. However, what is important and common to all of the above embodiments is that the point of connection 9 on the valve back is at a position lying above the valve seat 13, and consequently not subjected to such great loads. The production of the valve disk 10 from highly heat resistant material can be performed in a way appropriate for this material, for example in a sintering operation or by cold extrusion.

FIGS. 6 to 9, illustrate alternative embodiments of the top end of the valve shank 3. The internal volume of the valve shanks 3 of current high efficiency engines is usually filled with a cooling medium, for example sodium, which is introduced into the valve shank 3 after the production operation previously described. After filling, the valve shank is closed in a suitable way. This may be performed as shown in FIG. 6, by a plug 14 being fitted onto the top shank end and welded to the latter at the seam 15. This plug 14 has not only the function of a closure for the hollow interior of the valve shank 3 but at the same time also takes over the receiving of the valve shank in a cap tappet (not shown here) of a valve operating mechanism. For this purpose, it may be produced from a material which can be hardened with respect to the valve shank 3.

Another embodiment of a plug 14 of a valve shank 3 is shown in FIG. 7. In this case, the plug 14 is positively introduced into the valve shank 3. Such positive connection 15 between plug 14 and valve shank 3 can be produced by bringing the valve shank 3 into close contact with the surface intended for the shaping of the lower plug part 16, by means of the round-kneading process described above. In this case, the plug 14 consists of martensitic steel, the surface of which may be inductively hardened, in order to absorb the load acting on the valve shank end.

FIGS. 8 and 9 depict still further embodiments of shaping of the upper end region of the valve shank 3. The valve shank 3 is reduced in a known way with the aid of the round-kneading process with inserted mandrel. The one end 17, forming the later termination of the valve shank 3, is not reduced in this case, so that the form represented in FIG. 8 is produced for the valve shank. Subsequently, end 17 is reduced to the desired shank diameter, with the mandrel removed, as a result of which this part is thickened and closes the shank end in the manner of a plug 14, as can be seen in FIG. 9. Then, a plate 18 of hardenable material can be fitted onto the thus-produced shank end which is subjected to severe wear, as a so-called tablet solution.

A valve of large internal volume, low weight and nevertheless high strength can be produced in a simple and quick way by the process according to the invention, with the use of high-strength material being confined to the regions in which it is essential.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Process for producing a valve of the type having a separately produced tubular valve shank with a widening shank section arranged at a first end thereof and a valve disk made of highly heat resistant material, which disk has a part forming the valve base, a part forming the valve seat and a valve back which includes a common point of connection with the valve shank, said common point of connection being characterized by a diameter, the valve shank and the valve disk being connected to each other at the common point of connection, said process comprising the steps of:

providing a tubular starting material from which said valve shank is to be formed;

reducing a portion of said tubular starting material to a desired shank diameter by cold forming;

shaping a transitional region lying between the reduced portion of the valve shank and the tubular starting material, said transition area being in the form of an arc and constituting said widening shank section;

severing the valve shank in the widening shank section at a point corresponding to the diameter of the common point of connection between the valve disk and valve shank; and connecting said valve shank to said valve disk at said common point of connection.

2. Process according to claim 1, wherein said valve is a charge cycle valve of an internal combustion engine.

3. Process according to claim 1, wherein said shank is closed at a second end, remote from the valve disk, by thickening of the tubular starting material.

4. Process according to claim 1, wherein the shank is closed at a second end, remote from the valve disk, by a plug.

5. Process according to claim 1, wherein in said connecting step the plug is laser-welded to the shank.

6. Process according to claim 1, wherein in said connecting step the plus is positively connected to the shank.

7. Process for producing a valve shank for a valve of the type having a separately produced tubular valve shank with a widening shank section arranged at a first end thereof and a valve disk made of highly heat resistant material, which disk has a part forming the valve base, a part forming the valve seat and a valve back which includes a common point of connection with the valve shank, said common point of connection being characterized by a diameter, the valve shank and the valve disk being connected to each other at the common point of connection, said process comprising the steps of:

providing a tubular starting material from which said valve shank is to be formed;

reducing a portion of said tubular starting material to a desired shank diameter by cold forming;

shaping a transitional region lying between the reduced portion of the valve shank and the tubular starting material, said transition area being in the form of an arc and constituting said widening shank section; and severing the valve shank in the widening shank section at a point corresponding to the diameter of the common point of connection between the valve disk and valve shank.

8. Process according to claim 7, wherein said valve is a charge cycle valve of an internal combustion engine.

9. Process according to claim 7, wherein said shank is closed at a second end, remote from the valve disk, by thickening of the tubular starting material.

10. Process according to claim 7, wherein the shank is closed at a second end, remote from the valve disk, by a plug.

11. Process for producing a valve shank for a valve of the type having a separately produced tubular valve shank with a widening shank section arranged at a first end thereof and a valve disk made of highly heat resistant material, which disk has a part forming the valve base, a part forming the valve seat and a valve back which includes a common point of connection with the valve shank, said common point of connection being characterized by a diameter, the valve shank and the valve disk being connected to each other at the common point of connection, said process comprising the steps of:

providing a tubular starting material from which said valve shank is to be formed;

reducing a first end portion of said tubular starting material to a desired shank diameter, by cold forming;

shaping a first transitional region lying between the reduced first end portion and the tubular starting material, said first transition area being in the form of an arc and constituting a first widening shank section;

clamping said first end portion in a holding tool;

reducing a second end portion of said tubular starting material to a desired shank diameter, by cold forming;

shaping a second transitional region lying between the reduced second end portion and said first transitional area, said second transitional area being in the form of an arc and constituting a second widening shank section; and severing said first and second widening shank sections at a point corresponding to the diameter of the common point of connection.

* * * * *